US012768933B2

(12) United States Patent
Butt et al.

(10) Patent No.: US 12,768,933 B2
(45) Date of Patent: Oct. 20, 2026

(54) TRIGGERING USER EQUIPMENT-SIDE MACHINE LEARNING MODEL UPDATE FOR MACHINE LEARNING-BASED POSITIONING

(71) Applicant: NOKIA TECHNOLOGIES OY, Espoo (FI)

(72) Inventors: Muhammad Majid Butt, Palaiseau (FR); István Zsolt Kovács, Aalborg (DK); Qiyang Zhao, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 255 days.

(21) Appl. No.: 18/691,591

(22) PCT Filed: Sep. 14, 2021

(86) PCT No.: PCT/EP2021/075203

§ 371 (c)(1),
(2) Date: Mar. 13, 2024

(87) PCT Pub. No.: WO2023/041144

PCT Pub. Date: Mar. 23, 2023

(65) Prior Publication Data

US 2024/0385278 A1 Nov. 21, 2024

(51) Int. Cl.
*G01S 5/02* (2010.01)
*G01S 5/00* (2006.01)
*G06N 5/04* (2023.01)

(52) U.S. Cl.
CPC .......... *G01S 5/0244* (2020.05); *G01S 5/0009* (2013.01); *G06N 5/04* (2013.01)

(58) Field of Classification Search
CPC .................................................... G01S 5/0244
USPC ...................................................... 455/456.6
See application file for complete search history.

(56) References Cited

U.S. PATENT DOCUMENTS 7,298,327 B2 * 11/2007 Dupray ................ G01S 5/0278 342/451
2019/0258756 A1 * 8/2019 Minwalla ................ G06F 30/20
2020/0154267 A1 5/2020 Soriaga et al.
2020/0219015 A1 7/2020 Lee et al.
(Continued)

FOREIGN PATENT DOCUMENTS

EP 4047382 A1 8/2022
WO 2021/063497 A1 4/2021

OTHER PUBLICATIONS

"3rd Generation Partnership Project; Technical Specification Group Services and System Aspects; Study on traffic characteristics and performance requirements for AI/ML model transfer in 5GS (Release 18)", 3GPP TR 22.874 V18.0.1, Jun. 2021, pp. 1-111.
(Continued)

*Primary Examiner* — Qutbuddin Ghulamali
(74) *Attorney, Agent, or Firm* — Barta Jones, PLLC

(57) ABSTRACT

Techniques of updating ML models include performing such an update when the UE satisfies certain criteria. In some implementations, the ML model is used by the UE to determine a location within a network. In some implementations, the criteria include a version number of the ML model being used by the UE. In some implementations, the criteria include a time elapsed since a last ML model update was provided to the user equipment.

9 Claims, 8 Drawing Sheets

(56) References Cited

U.S. PATENT DOCUMENTS

| | | | | |
|---|---|---|---|---|
| 2020/0382968 | A1 | 12/2020 | Gupta et al. | |
| 2022/0206103 | A1* | 6/2022 | Takeuchi | G01S 5/0278 |

OTHER PUBLICATIONS

Butt et al., "RF Fingerprinting and Deep Learning Assisted UE Positioning in 5G", IEEE 91st Vehicular Technology Conference (VTC-Spring), May 25-28, 2020, 7 pages.
Xie et al., "Data Augmentation for Radio Frequency Fingerprinting via Pseudo-Random Integration", IEEE Transactions on Emerging Topics in Computational Intelligence, vol. 04, No. 03, Jun. 2020, pp. 276-286.
"3rd Generation Partnership Project; Technical Specification Group Radio Access Network; NR; Radio Resource Control (RRC) Protocol Specification (Release 16)", 3GPP TS 38.331, V16.5.0, Jun. 2021, pp. 1-959.
"Support for Al/ML for positioning accuracy enhancement", 3GPP TSG RAN WG2 Meeting #127bis, R2-2408725, Agenda: 8.1.2.3, Sony, Oct. 14-18, 2024, 10 pages.
International Search Report and Written Opinion received for corresponding Patent Cooperation Treaty Application No. PCT/EP2021/075203, dated May 27, 2022, 12 pages.
"3rd Generation Partnership Project; Technical Specification Group Services and System Aspects; Functional stage 2 description of Location Services (LCS) (Release 15)", 3GPP TS 23.271 V15.1.0, Sep. 2018, pp. 1-184.
Office action received for corresponding Indian Patent Application No. 202417016198, dated Apr. 30, 2026, 10 pages.

* cited by examiner

TRIGGERING USER EQUIPMENT-SIDE MACHINE LEARNING MODEL UPDATE FOR MACHINE LEARNING-BASED POSITIONING

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, from a network or a direct measurement, first inference input data representing inference inputs into an inference operation on specified radio measurements within the network, the inference operation including a machine learning model configured to predict a first value of a device parameter based on specified radio measurements. The method also includes transmitting, to a server connected to the network, indication data representing an indication of accuracy of an inference output based on the machine learning model in determining the value of the device parameter. The method further includes receiving or not receiving, from the server, an update to the machine learning model based on the indication data the update enabling the machine learning model to predict a second value of the device parameter based on the specified radio measurements, the second value being more accurate than the first value.

According to an example implementation, an apparatus includes at least one processor and at least one memory including computer program code, the at least one memory and the computer program code configured to, with the at least one processor, cause the apparatus at least to receive, from a network or a direct measurement, first inference input data representing inference inputs into an inference operation on specified radio measurements within the network, the inference operation including a machine learning model configured to predict a first value of a device parameter based on specified radio measurements. The at least one memory and the computer program code are also configured to, with the at least one processor, cause the apparatus at least to transmit, to a server connected to the network, indication data representing an indication of an accuracy of an inference output based on the machine learning model in determining the first value of the device parameter. The at least one memory and the computer program code are further configured to, with the at least one processor, cause the apparatus at least to receive or not receive, from the server, an update to the machine learning model based on the indication data the update enabling the machine learning model to predict a second value of the device parameter based on the specified radio measurements, the second value being more accurate than the first value.

According to an example implementation, an apparatus includes means for receiving, from a network or a direct measurement, first inference input data representing inference inputs into an inference operation on specified radio measurements within the network, the inference operation including a machine learning model configured to predict a first value of a device parameter based on specified radio measurements. The apparatus also includes means for transmitting, to a server connected to the network, indication data representing an indication of an accuracy of an inference output based on the machine learning model in determining the value of the device parameter. The apparatus further includes means for receiving or not receiving, from the server, an update to the machine learning model based on the indication data the update enabling the machine learning model to predict a second value of the device parameter based on the specified radio measurements, the second value being more accurate than the first value.

According to an example implementation, a computer program product includes a computer-readable storage medium and storing executable code that, when executed by at least one data processing apparatus, is configured to cause the at least one data processing apparatus to receive, from a network or a direct measurement, first inference input data representing inference inputs into an inference operation on specified radio measurements within the network, the inference operation including a machine learning model configured to predict a first value of a device parameter based on specified radio measurements. The executable code, when executed by at least one data processing apparatus, is also configured to cause the at least one data processing apparatus to transmit, to a server connected to the network, indication data representing an indication of an accuracy of an inference output based on the machine learning model in determining the first value of the device parameter. The executable code, when executed by at least one data processing apparatus, is further configured to cause the at least one data processing apparatus to receive or not receive, from the server, an update to the machine learning model based on the indication data the update enabling the machine learning model to predict a second value of the device parameter based on the specified radio measurements, the second value being more accurate than the first value.

According to an example implementation, a method includes receiving, from a user equipment in a network, indication data representing an indication of an accuracy of an inference output based on a machine learning model in determining a value of a device parameter. The method also includes determining, based on the indication data, whether to transmit an update to the machine learning model to the user equipment.

According to an example implementation, an apparatus includes at least one processor and at least one memory including computer program code, the at least one memory and the computer program code configured to, with the at least one processor, causes the apparatus at least to receive, from a user equipment in a network, indication data representing an indication of an accuracy of an inference output based on a machine learning model in determining a value of a device parameter. The at least one memory and the computer program code are also configured to determine, based on the indication data, whether to transmit an update to the machine learning model to the user equipment.

According to an example implementation, an apparatus includes means for receiving, from a user equipment in a network, indication data representing an indication of an accuracy of an inference output based on a machine learning model in determining a value of a device parameter. The apparatus also includes means for determining, based on the indication data, whether to transmit an update to the machine learning model to the user equipment.

According to an example implementation, a computer program product includes a computer-readable storage medium and storing executable code that, when executed by at least one data processing apparatus, is configured to cause the at least one data processing apparatus to receive, from a user equipment in a network, indication data representing an indication of an accuracy of an inference output based on a machine learning model in determining a value of a device parameter. The executable code, when executed by at least one data processing apparatus, is also configured to cause the at least one data processing apparatus to determine, based on the indication data, whether to transmit an update to the machine learning model to the user equipment.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
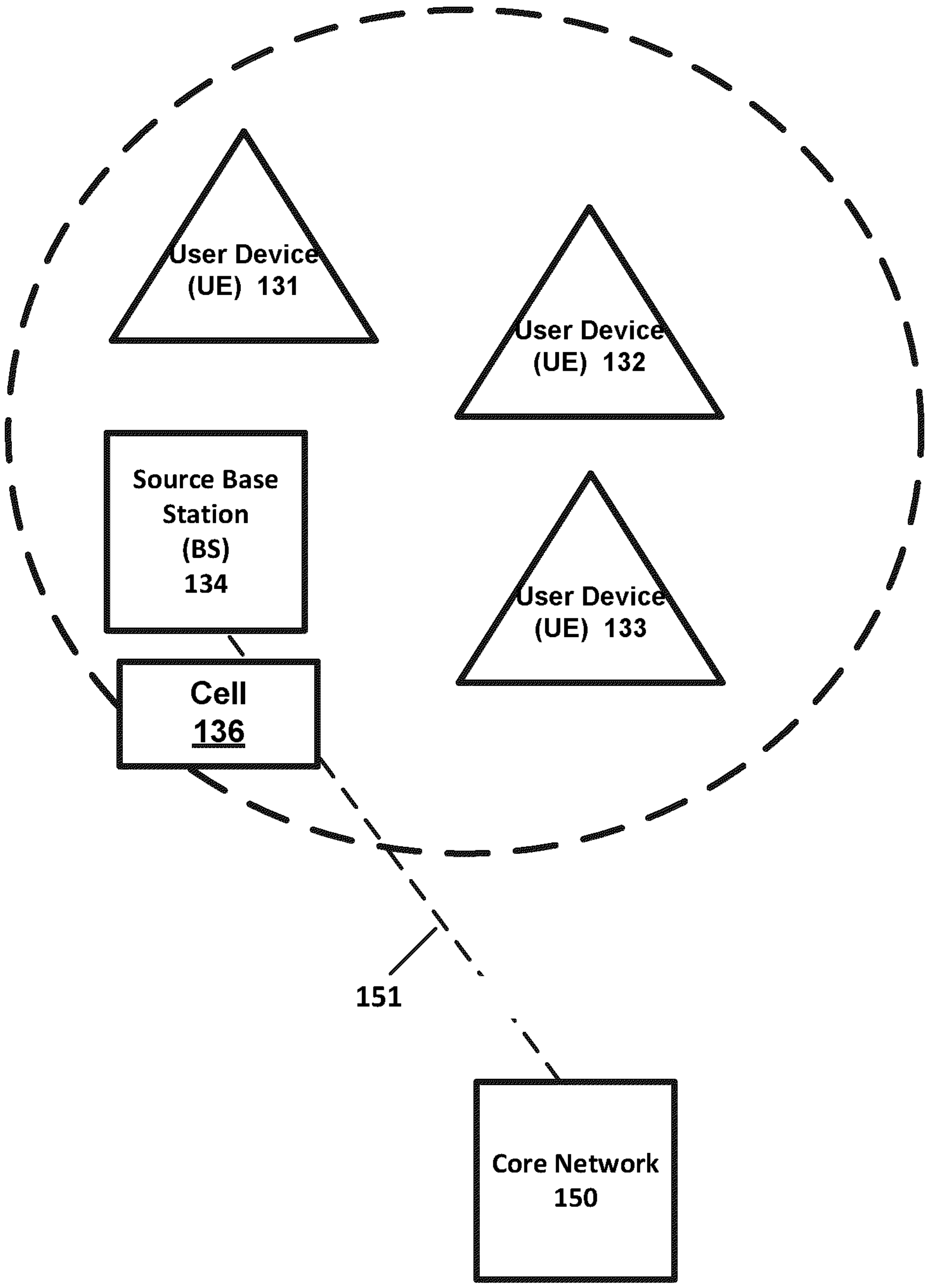
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Machine learning (ML) will be used extensively in 5G, 5G-Advancd, and Beyond 5G networks to optimize various network functions including user equipment (UE) positioning, proactive handover control, uplink power control, and load balancing, to name a few. Though many trained ML models may use more generous computational resources hosted at a network side, ML models may be hosted at UE side as well to reduce latency. For example, while a UE positioning function may be performed at the network side (e.g., using a location server), however a UE may prefer positioning inference at UE side if its precise location is to be used for an application with low latency. Industrial robotics is an example of such a use case where latency requirements are very stringent and UE positioning requirements may reach to accuracy of 1 cm. UE manufacturers are continuously looking to increase UE capabilities for hosting ML-trained models in networks and it is expected that UE capability enhancement will leverage the use of artificial intelligence.

In an example, a network trains an ML model based on radio measurements, beam RSRP being one such example (angle of arrival (AoA) could be another). Then the trained model is transported to the UEs via network radio links to the UEs which perform real time inference on UE positioning.

When an ML model is hosted at UEs for inference, it needs a continuous model evaluation and retraining of the model if the model's performance degrades considerably due to changing radio conditions. To trigger retraining of ML model, inference statistics of all UEs are taken into account. Due to more computational resources and availability of input data at network, retraining of the ML model is again performed at the network side.

Once a new ML model is computed (periodically or based on a trigger), it again needs to be transferred to all UEs using radio communication links. Thus, model training and subsequent transfer to the UEs can be broken as a two-step process:

1. Retrain ML Model
   - Receive positioning inference results from multiple UEs.
   - Evaluate ML model inference accuracy based on various statistics of UE inference results.
   - Decide to retrain ML model in the network.
2. Transfer retrained ML model to the UEs
   - Once trained model is available at network location server, it needs to be transferred back to UEs for local inference.

In conventional ML model updating, it is assumed that both of these steps are performed sequentially, i.e., whenever an updated ML model is available at the network, it is immediately transferred to all UEs configured to use it.

The conventional ML model updating burdens already-congested radio network links (both downlink and uplink, U-plane and C-plane) if the frequency of model retraining/updating is excessively high and the number of UEs to be updated is reasonably large.

In contrast to the above-described conventional approaches to updating ML models, improved techniques of updating ML models include performing such an update when the UE satisfies certain criteria. In some implementations, the ML model is used by the UE to determine a location within a network. In some implementations, the criteria include a version number of the ML model being used by the UE. In some implementations, the criteria include a time elapsed since a last ML model update was provided to the user equipment.

Advantageously, the above-described improved technique for conventional ML model updating reduces the burden on the network by only updating asynchronously and in response to specified criteria being satisfied.

Figure 2A:
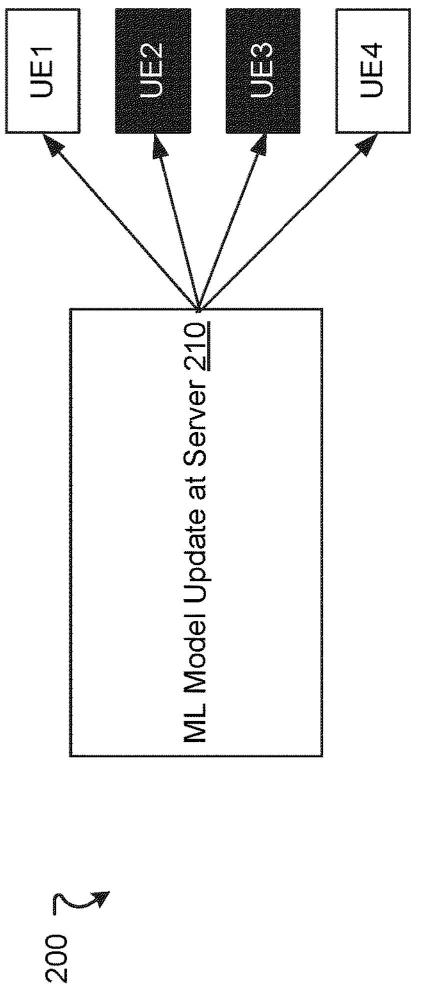
FIG. 2A is a diagram illustrating a scenario in which a server updates all UEs it is serving regardless of ML model usage according to an example implementation.
Figure 2B:
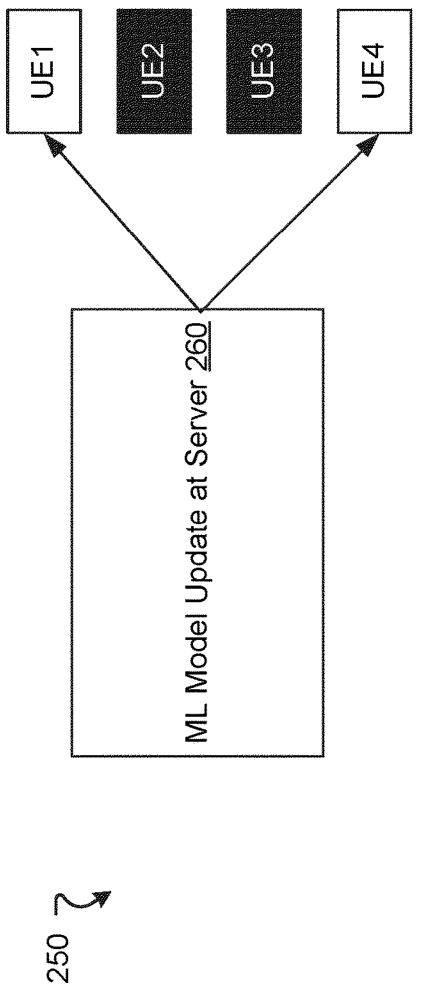
FIG. 2B is a diagram illustrating a scenario in which a server updates UEs it is serving depending on ML model usage according to an example implementation.

The improved technique includes a method to trigger local model update at UEs for improved UE location accuracy without unnecessary model updates, while reduced signalling overhead and reduced traffic (U-plane and C-plane) is achieved. The UE selection for ML model update can be performed asynchronously and only the UEs making active inferences can be selected for ML model updates as illustrated in FIG. 2B.

In some implementations, model updates for the UEs are provided based on a time history of recent use of ML model for UE positioning as well as a time elapsed since a previous update of its ML model. That is, a server selects UEs for model-update meeting the following two conditions:

- In current network most updated model version is M, and UE uses an old model version number M', e.g. based on model version number comparison M'<M.
- Number of inferences (i.e., deductions from measurements) being greater than a threshold number of inferences in a time window, e.g. a counter could be used for number of inferences within a timer T.

The improved technique helps to reduce congestion on radio links without compromising on positioning inference accuracy for the UEs. For example, it could be possible that a UE is idle for long time, makes a positioning inference with an outdated ML model, and sleeps for long time again. In the conventional ML model updating, the UE's ML model may need immediate ML model update based on (possible) poor inference results but updating ML model for this particular UE is not efficient for radio link usage. Therefore, performance degradation due to poor inference is tolerated for this particular UE to improve overall network efficiency. As a matter of fact, if the UE does not use ML models for long time, the network may have updated several versions of ML model and UE can skip the updating all of them without any performance loss.

Figure 3:
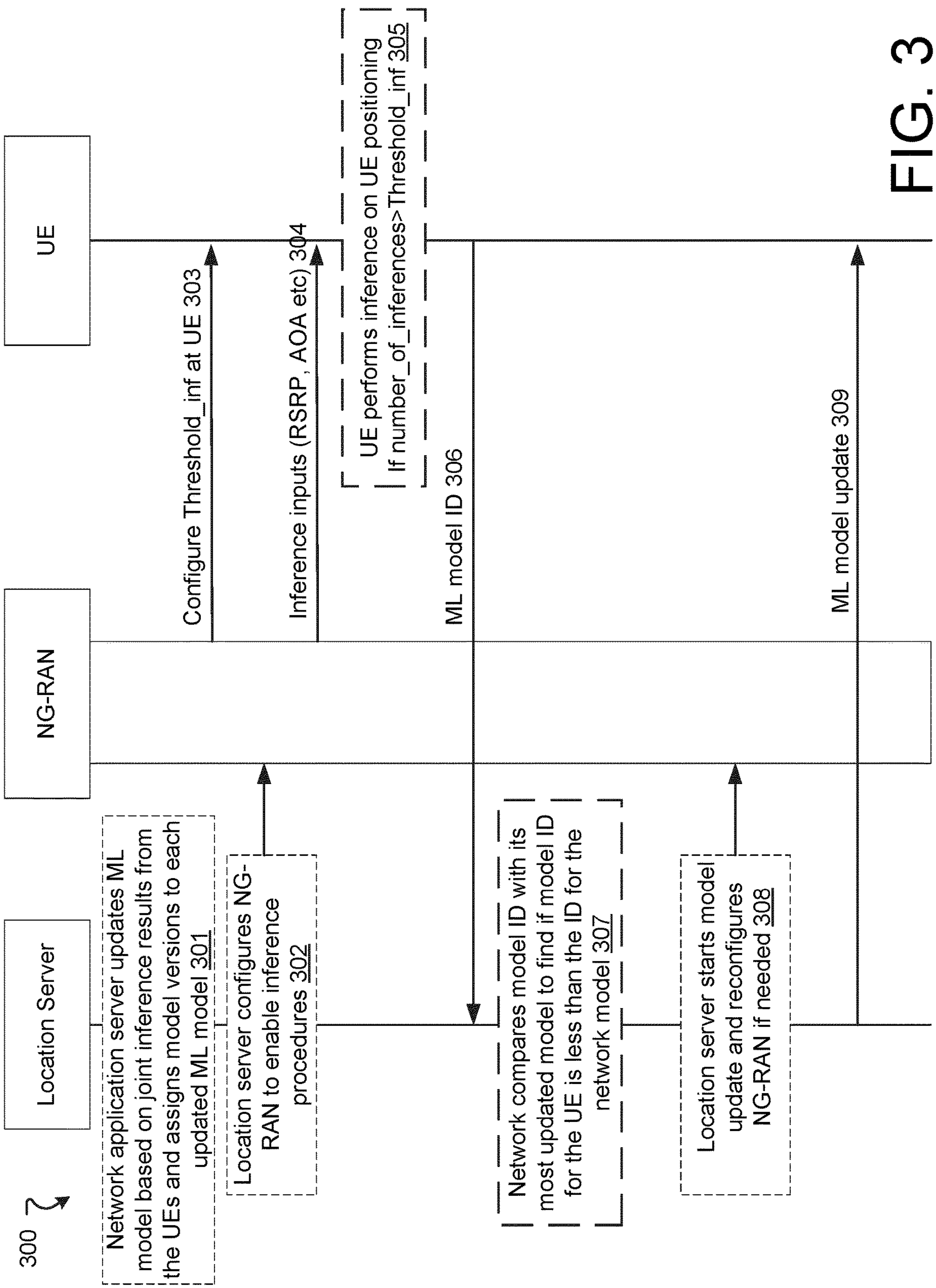
FIG. 3 is a sequence diagram illustrating an explicit version control, according to an example implementation.

FIG. 3 is a sequence diagram illustrating is a sequence diagram illustrating an explicit version control. With an explicit version control, every ML model version has an ID and an associated mean location accuracy mean (location accuracy).

- Every time the ML model is updated (re-trained) at network location server, its model ID is incremented. The associated mean positioning accuracy might change or remain the same as before the model update.
- Input data for ML model re-training is provided from UE reports.

At 301, the location server updates a ML model based on joint inference results from the UEs and assigns model versions to each updated ML model.

At 302, the location server configures the NG-RAN to enable inference procedures.

At 303, the NG-RAN configures a threshold number of inferences based on the estimated number of UE location reports within a certain time window. A higher threshold results in fewer ML model updates and more chances of erroneous positioning estimates; a lower threshold results in more ML model updates and fewer chances of erroneous positioning.

At 304, the NG-RAN provides inputs such as reference signal received power (RSRP), angle of arrival (AOA), or the like to the UE for measurement and inference.

At 305, the UE performs inference on the measurements of the provided inputs.

At 306, in response to the number of inferences made by the UE being greater than the threshold configured by the NG-RAN, the UE transmits a ML model identifier (e.g., a version number) to the location server.

Note that, in some implementations, the UE transmits the ML model identifier periodically rather than in response to an event. In some implementations, the period of transmission is configured by the NG-RAN.

At 307, the location server compares each of the received model IDs from the UEs, M', with the most up to date (current) model ID, M i.e., check if M'<M. In some implementations, the location server checks (in addition to or as an alternative) the last updated time against an elapsed time threshold.

At 308, the location server determines that a ML model update is needed and, if needed, reconfigures the NG-RAN.

At 309, the location server determines, based on the data received from the UE, to provide the UE with a ML model update.

Figure 4:
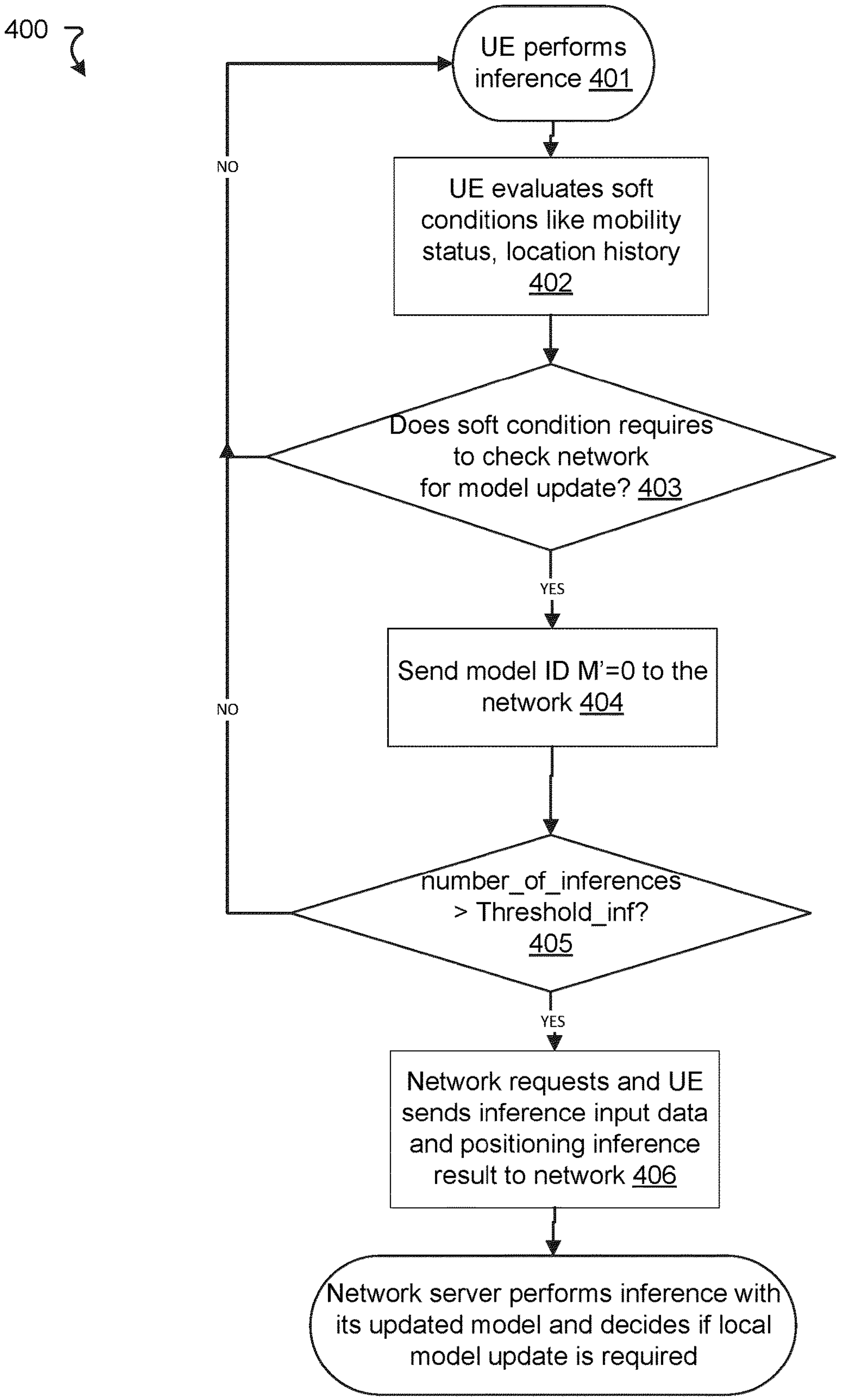
FIG. 4 is a flow chart illustrating a process of updating an ML model without version control according to an example implementation.

FIG. 4 is a flow chart illustrating a process 400 of updating an ML model without explicit version control and with explicit accuracy comparison of UE local model and network most updated model.

At 401, the UE performs an inference based on measurements provided to it from the NG-RAN. The inference is performed using a version of a ML model that determines a value of a device parameter, e.g., location, uplink power control, load balancing, etc. It is assumed herein that the device parameter is a UE location.

At 402, the UE evaluates soft conditions such as its recent inference history, mobility state changes, etc. Fast mobility and fast changing location in recent history may trigger a need for a ML model check.

At 403, the UE determines whether the soft conditions indicate a need for a ML model update.

At 404, the UE determines that the soft conditions indicate a need for a ML model update, and in response, UE transmits a model update request to the network location server, by signalling a model ID M'=0. This request is a soft signal/trigger, which does not necessarily initiate the model update, as fast mobility or poor (past) inference decisions are not always due to outdated ML model at UE.

At 405, the location server receives model ID M'=0 and checks the condition that the number of inferences performed by the UE within a time window T is greater than a specified inference threshold. The NG-RAN keeps track of UE positioning information and the number of inferences may be deduced. Note that the network location server configures (at network side) the inference threshold based on the estimated number of UE location reports within a certain time window for a particular UE.

In some implementations, the location server checks (in addition to or as an alternative) the last updated time against an elapsed time threshold.

At 406, in response to the condition being met, the network location server requests from the UE report containing the latest estimated inference accuracy metric and the corresponding input data used.

At 407, the location server performs an inference with an updated ML model, based on a comparison with inference results from the UE, determines whether to transmit the updated ML model to the UE.

Figure 5:
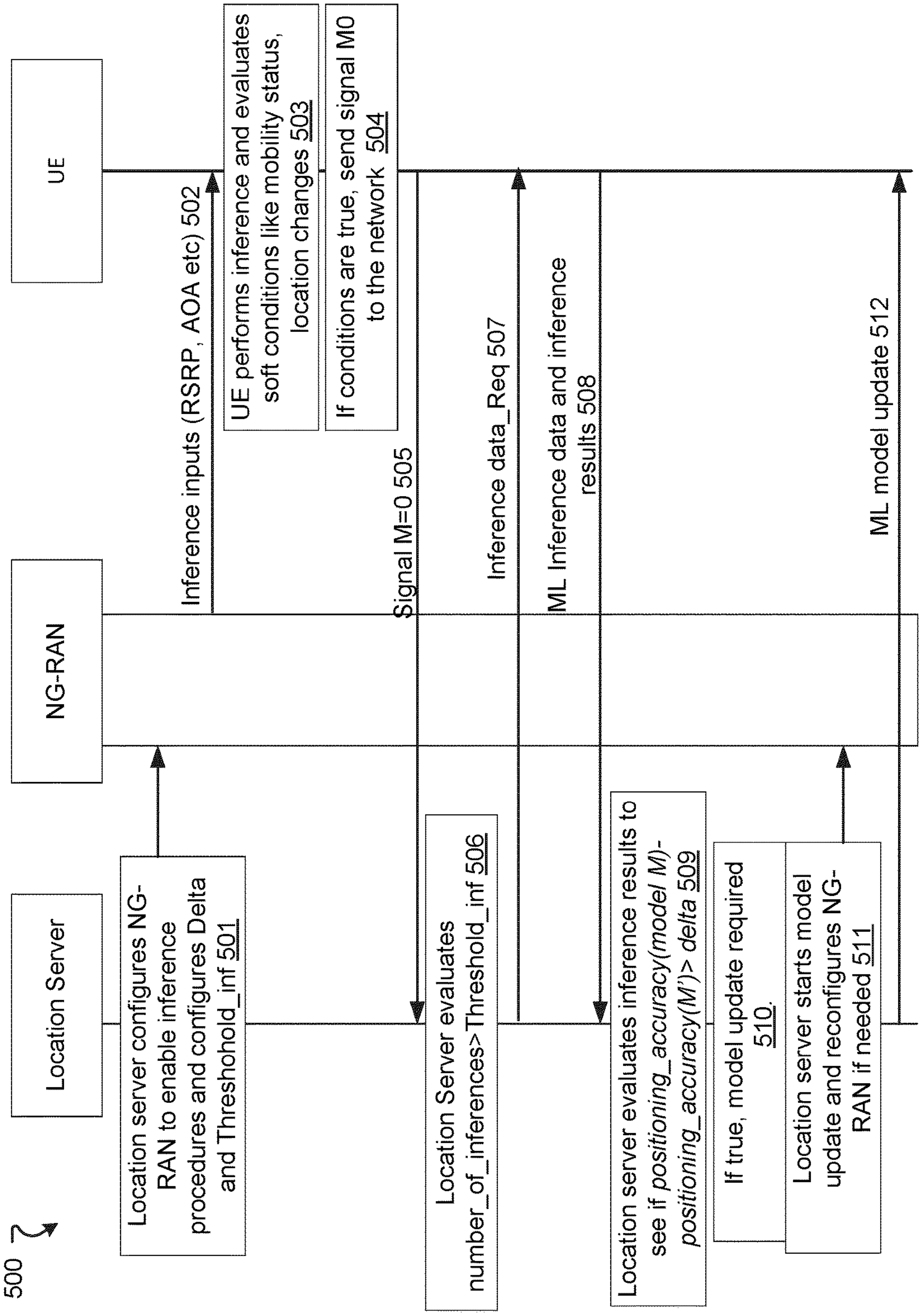
FIG. 5 is a sequence diagram illustrating a process of updating an ML model without version control according to an example implementation.

FIG. 5 is a sequence diagram illustrating a process of updating an ML model without version control.

At 501, the location server configures the NG-RAN to enable inference procedures and configures an inference threshold and error tolerance.

At 502, the NG-RAN provides inputs such as reference signal received power (RSRP), angle of arrival (AOA), or the like to the UE for measurement and inference.

At 503, the UE performs inference on the measurements of the provided inputs and evaluates soft conditions such as mobility status, location changes, etc.

At 504 and 505, in response to the soft conditions being met, the UE transmits a model update request to the network location server, by signalling a model ID M'=0. This request is a soft signal/trigger, which does not necessarily initiate the model update, as fast mobility or poor (past) inference decisions are not always due to outdated ML model at UE At 506, the location server receives model ID M'=0 and checks the condition that the number of inferences performed by the UE within a time window T is greater than a specified inference threshold.

At 507, in response to the condition being met, the location server requests from the UE report containing the latest estimated inference accuracy metric and the corresponding input data used.

At 508, the UE sends its inference result and input data to the location server.

At 509, the location server performs inference for UE positioning with its most recently trained model version M, and compares positioning accuracy with the accuracy associated with the version M e.g., checking positioning accuracy (model M)-positioning accuracy (M')>tolerance. In some implementations accuracy is computed by assuming that a more non-ML based, more accurate positioning method is available. Otherwise, ML model version M is assumed to be more accurate with no error (as it is the most updated model) and simple difference in positioning prediction is determined by evaluating positioning inference (model M)-positioning ineference (M')>tolerance.

At 510 and 511, in response to the conditions at 510 being met, the location server begins updating the ML model and, if needed, reconfigures the NG-RAN.

At 512, the location server transmits the updated ML model to the UE.

Figure 6:
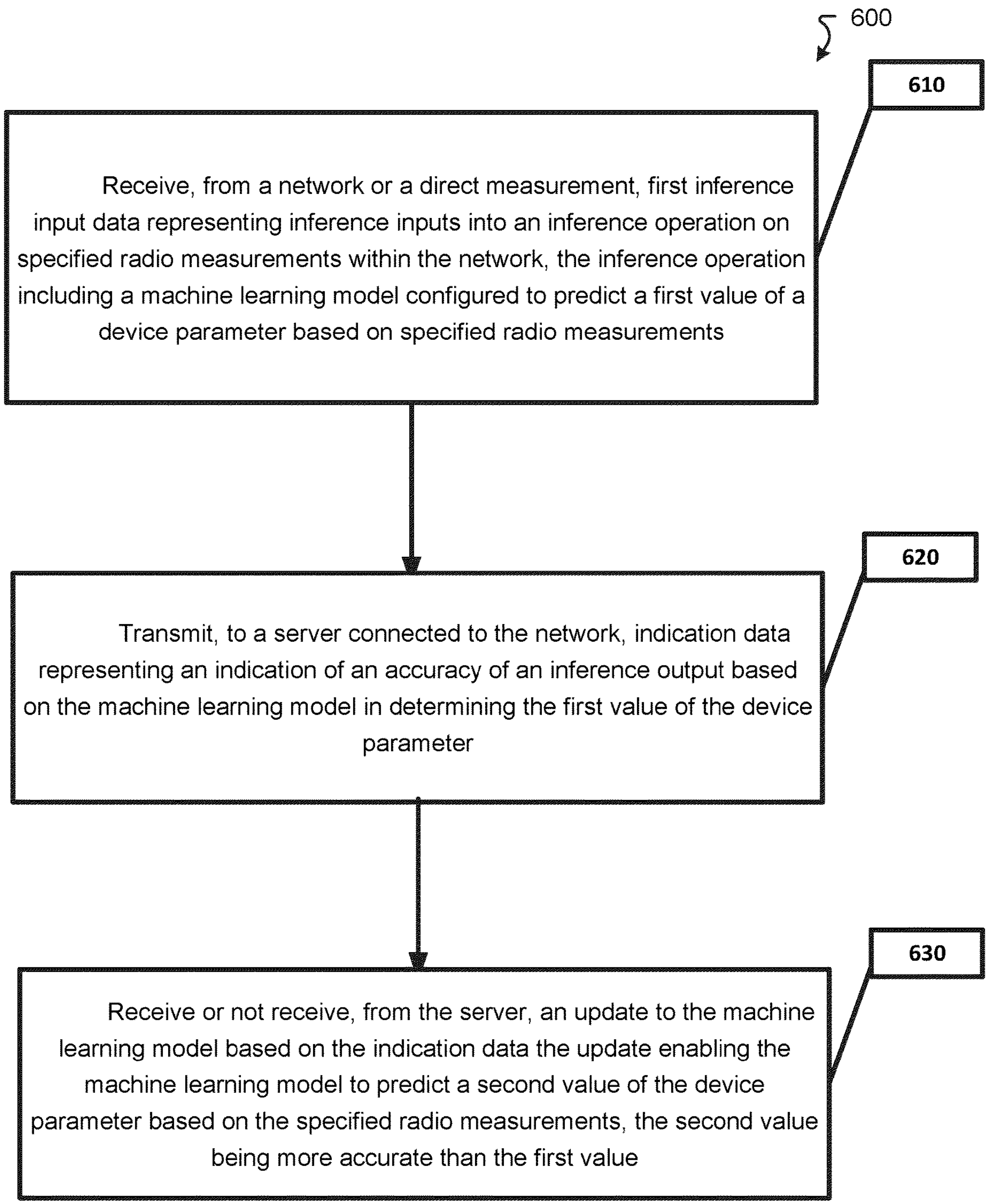
FIG. 6 is a flow chart illustrating a process of updating an ML model according to an example implementation

Example 1-1: FIG. 6 is a flow chart illustrating a process 600 of updating an ML model. Operation 610 includes receiving, from a network or a direct measurement, first inference input data representing inference inputs into an inference operation on specified radio measurements within the network, the inference operation including a machine learning model configured to predict a first value of a device parameter based on specified radio measurements. Operation 620 includes transmitting, to a server connected to the network, indication data representing an indication of an accuracy of an inference output based on the machine learning model in determining the value of the device parameter. Operation 630 includes receiving or not receiving, from the server, an update to the machine learning model based on the indication data the update enabling the machine learning model to predict a second value of the device parameter based on the specified radio measurements, the second value being more accurate than the first value.

Example 1-2: According to an example implementation of example 1-1, wherein the device parameter is a user equipment location within the network and the server is a location server.

Example 1-3: According to an example implementation of example 1-2, wherein the specified radio measurements include a reference signal received power.

Example 1-4: According to an example implementation of examples 1-2 and 1-3, wherein the indication data includes a version number of the machine learning model.

Example 1-5: According to an example implementation of example 1-4, wherein the indication data is transmitted periodically according to a specified period.

Example 1-6: According to an example implementation of example 1-5, wherein the specified period is specified by the network.

Example 1-7: According to an example implementation of examples 1~4 to 1-6, wherein the indication data is transmitted in response to a condition being satisfied.

Example 1-8: According to an example implementation of example 1-7, wherein the condition being satisfied includes a number of inference operations performed by the apparatus within a specified time window being greater than a specified inference threshold.

Example 1-9: According to an example implementation of example 1-8, further comprising receiving, from the network, threshold data representing the inference threshold.

Example 1-10: According to an example implementation of examples 1-7 to 1-9, wherein the condition being satisfied includes a time at which the machine learning model was last updated being greater than a threshold time.

Example 1-11: According to an example implementation of examples 1-1 to 1-2, wherein the condition being satisfied includes any of a frequency of inferences being greater than a threshold and a frequency of estimated location changes being greater than a threshold.

Example 1-12: According to an example implementation of example 1-11, further comprising transmitting to the server, the first inference input data used in the inference operation.

Example 1-13: According to an example implementation of examples 1-11 or 1-12, wherein the indication data includes a trigger for the server to determine whether to transmit the update to the machine learning model to the apparatus.

Example 1-14: An apparatus comprising means for performing a method of any of examples 1-1 to 1-13.

Example 1-15: A computer program product including a non-transitory computer-readable storage medium and storing executable code that, when executed by at least one data processing apparatus, is configured to cause the at least one data processing apparatus to perform a method of any of examples 1-1 to 1-13.

Figure 7:
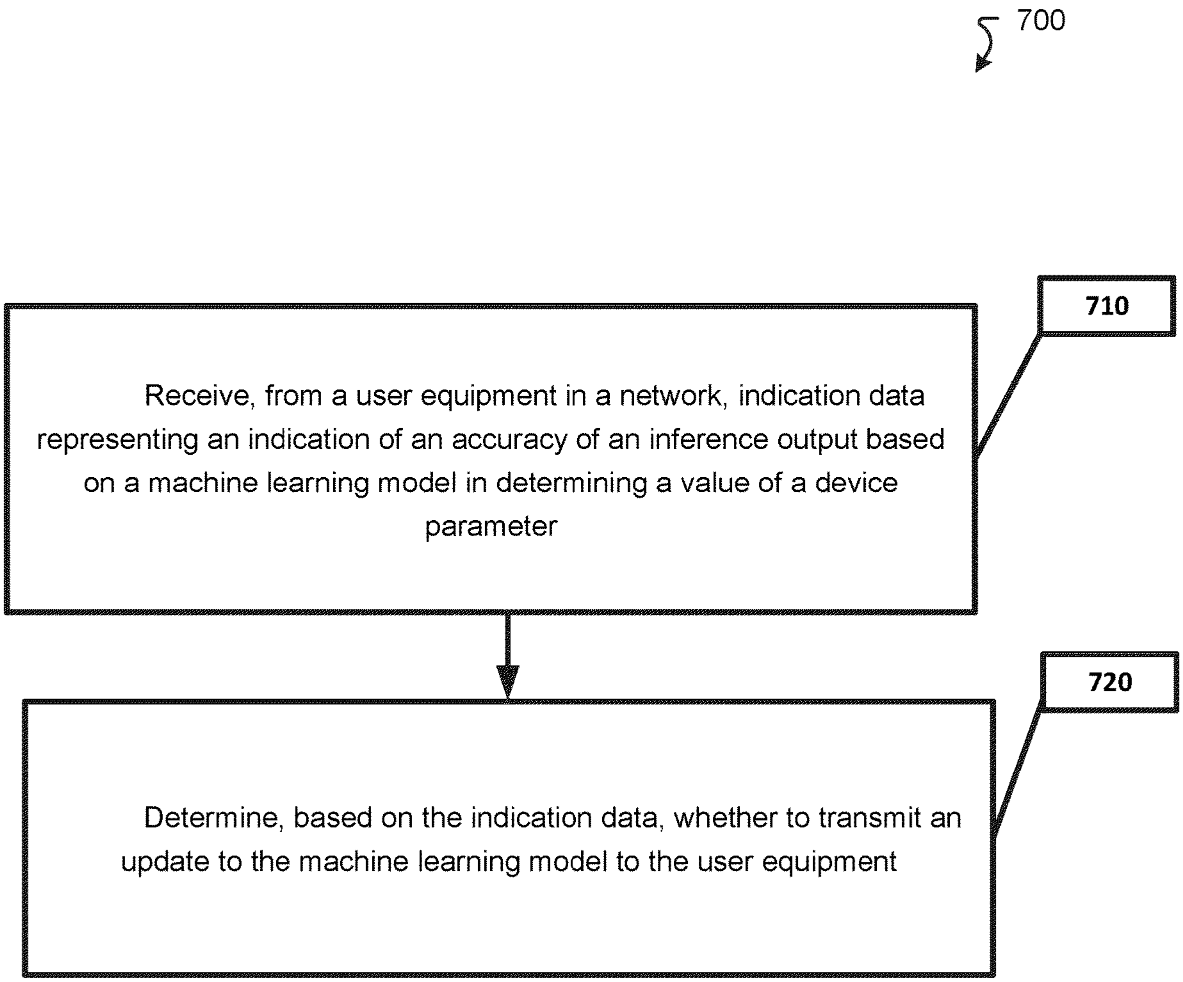
FIG. 7 is a flow chart illustrating a process of updating an ML model according to an example implementation.

Example 2-1: FIG. 7 is a flow chart illustrating a process 700 of updating an ML model. Operation 710 includes receiving, from a user equipment in a network, indication data representing an indication of an accuracy of an inference output based on a machine learning model in determining a value of a device parameter. Operation 720 includes determining, based on the indication data, whether to transmit an update to the machine learning model to the user equipment.

Example 2-2: According to an example implementation of example 2-1, wherein the device parameter is a user equipment positioning within the network and the apparatus includes a location server.

Example 2-3: According to an example implementation of example 2-2, wherein the specified radio measurements include a reference signal received power.

Example 2-4: According to an example implementation of examples 2-2 to 2-3, wherein the indication data is transmitted periodically according to a period.

Example 2-5: According to an example implementation of example 2-4, further comprising specifying the period based on an estimated number of location reports transmitted by the user equipment within a specified time window.

Example 2-6: According to an example implementation of example 2-5, wherein the indication data is transmitted in response to a condition being satisfied.

Example 2-7: According to an example implementation of examples 2-4 to 2-6, wherein the condition being satisfied includes a time at which the machine learning model was last updated being greater than a threshold time.

Example 2-8: According to an example implementation of examples 2-4 to 2-7, wherein the condition being satisfied includes any of a frequency of inferences being greater than a threshold and a frequency of position changes being greater than a threshold.

Example 2-9: According to an example implementation of examples 2-1 to 2-8, wherein the indication data includes a version number of the machine learning model.

Example 2-10: An apparatus comprising means for performing a method of any of examples 2-1 to 2-9.

Example 2-11: A computer program product including a non-transitory computer-readable storage medium and storing executable code that, when executed by at least one data processing apparatus, is configured to cause the at least one data processing apparatus to perform a method of any of examples 2-1 to 2-9.

LIST OF EXAMPLE ABBREVIATIONS

Figure 8:
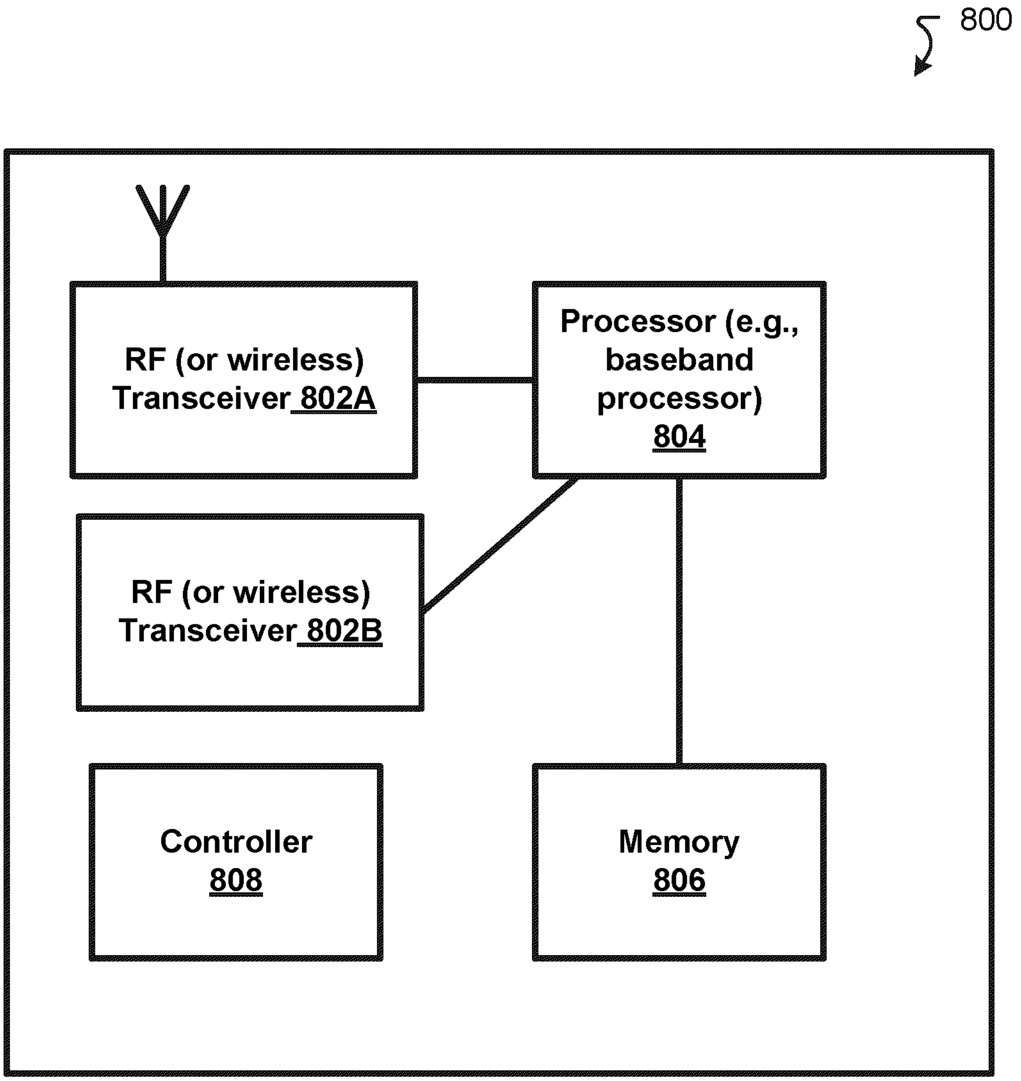
FIG. 8 is a block diagram of a node or wireless station (e.g., base station/access point, relay node, or mobile station/user device) according to an example implementation.

CN (5G) Core Network
LMF Location Mobility Function
FL Federater learning
ML Machine learning
NG-RAN Next-generation radio access network
UE User Equipment FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A user equipment (UE), comprising:

at least one processor; and at least one memory including computer program code;

the at least one memory and the computer program code configured to cause the UE at least to:

receive, from a network, first inference input data representing inference inputs for an inference operation based on specified radio measurements within the network, the inference operation being performed using a machine learning model hosted by the UE, the machine learning model configured to predict a first value of a location of the UE based on the specified radio measurements comprising at least one of a reference signal received power (RSRP) or an angle of arrival (AOA);

receive, from the network, data defining an inference threshold;

transmit, to a server connected to the network, indication data comprising at least one of a version number of the machine learning model or a trigger signal comprising a pre-defined model identifier value, wherein the indication data is transmitted in response to a condition being satisfied, the condition comprising:

a number of inference operations performed by the UE within a time window exceeding the received inference threshold, and a determination that a soft condition is satisfied, the soft condition relating to at least one of a mobility status, a history of location changes, or a frequency of inferences exceeding a frequency threshold;

in response to the indication data comprising the trigger signal, receive, from the server, a request for the first inference input data, and in response to the request, transmit the first inference input data and at least one of the first value of the location or an accuracy metric associated with the first value to the server; and receive, from the server, an update to the machine learning model, the update enabling the machine learning model to predict a second value of a location the UE based on the specified radio measurements, wherein:

the second value has a positioning error that is less than a positioning error of the first value, and the positioning error is defined as a deviation from a reference value, the reference value being derived from at least one of:

a version of the machine learning model trained after the machine learning model hosted by the UE, or a non-machine-learning-based positioning method having a lower positioning error than the machine learning model.

2. The UE as in claim 1, wherein the condition being satisfied includes a determination that a time elapsed since the machine learning model was last updated exceeds a threshold time.

3. The UE of claim 1, wherein the soft condition comprises a change in a mobility state of the UE from a low-mobility state to a high-mobility state.

4. The UE of claim 3, wherein the UE is further configured to receive, from the network, an updated inference threshold, wherein the updated inference threshold is determined by the server based on a current network load condition such that the updated inference threshold is increased during periods of high network load.

5. The UE of claim 4, wherein the determination that the soft condition is met is triggered in response to the UE reporting a handover failure or a radio link failure to the network.

6. The UE of claim 5, wherein the update to the machine learning model comprises updating a set of model parameters of a machine learning model stored in the at least one memory.

7. The UE of claim 6, wherein the non-machine-learning-based positioning method comprises at least one of Observed Time Difference of Arrival (OTDOA), Uplink Time Difference of Arrival (UTDOA), or a Global Navigation Satellite System (GNSS) measurement.

8. A method performed by a user equipment (UE), the method comprising:

receiving, from a network, first inference input data representing inference inputs for an inference operation based on specified radio measurements within the network, the inference operation being performed using a machine learning model hosted by the UE, the machine learning model configured to predict a first value of a location of the UE based on the specified radio measurements comprising at least one of a reference signal received power (RSRP) or an angle of arrival (AOA);

receiving, from the network, data defining an inference threshold;

transmitting, to a server connected to the network, indication data comprising at least one of a version number of the machine learning model or a trigger signal comprising a pre-defined model identifier value, wherein the indication data is transmitted in response to a condition being satisfied, the condition comprising:

a number of inference operations performed by the UE within a time window exceeding the received inference threshold, and a determination that a soft condition is satisfied, the soft condition relating to at least one of a mobility status, a history of location changes, or a frequency of inferences exceeding a frequency threshold;

in response to the indication data comprising the trigger signal, receive, from the server, a request for the first inference input data, and in response to the request, transmit the first inference input data and at least one of the first value of the user equipment location or an associated accuracy metric associated with the first value to the server; and receiving, from the server, an update to the machine learning model, the update enabling the machine learning model to predict a second value of a location of the UE based on the specified radio measurements, wherein:

the second value has a positioning error that is less than a positioning error of the first value, and the positioning error is defined as a deviation from a reference value, the reference value being derived from at least one of: a version of the machine learning model trained after the machine learning model hosted by the UE, or a non-machine-learning-based positioning method having a lower positioning error than the machine learning model.

9. A non-transitory computer storing computer-executable instructions that, when executed by a processor of a user equipment (UE), cause the processor to perform the following operations:

receiving, from a network, first inference input data representing inference inputs for an inference operation based on specified radio measurements within the network, the inference operation being performed using a machine learning model hosted by the UE, the machine learning model configured to predict a first value of a location of the UE based on the specified radio measurements comprising at least one of a reference signal received power (RSRP) or an angle of arrival (AOA);

receiving, from the network, data defining an inference threshold;

transmitting, to a server connected to the network, indication data comprising at least one of a version number of the machine learning model or a trigger signal comprising a pre-defined model identifier value, wherein the indication data is transmitted in response to a condition being satisfied, the condition comprising:

a number of inference operations performed by the UE within a time window exceeding the received inference threshold, and a determination that a soft condition is satisfied, the soft condition relating to at least one of a mobility status, a history of location changes, or a frequency of inferences exceeding a frequency threshold;

in response to the indication data comprising the trigger signal, receive, from the server, a request for the first inference input data. and in response to the request, transmit the first inference input data and at least one of the first value of the location or an accuracy metric associated with the first value to the server; and receiving, from the server, an update to the machine learning model, the update enabling the machine learning model to predict a second value of a location the UE based on the specified radio measurements, wherein:

the second value has a positioning error that is less than a positioning error of the first value, and the positioning error is defined as a deviation from a reference value, the reference value being derived from at least one of: a version of the machine learning model trained after the machine learning model hosted by the UE, or a non-machine-learning-based positioning method having a lower positioning error than the machine learning model.

* * * * *